United States Patent [19]

Magoon

[11] Patent Number: 4,631,837

[45] Date of Patent: Dec. 30, 1986

[54] METHOD AND APPARATUS FOR DRYING FRUIT PULP AND THE LIKE

[76] Inventor: Richard E. Magoon, 8545 27th St. West, Tacoma, Wash. 98466

[21] Appl. No.: 739,991

[22] Filed: May 31, 1985

[51] Int. Cl.[4] .............................................. F26B 3/20
[52] U.S. Cl. ............................................ 34/9; 34/39; 34/71; 34/93; 34/95; 99/483
[58] Field of Search ...................... 34/9, 71, 95, 39, 93; 99/483; 126/246; 165/46, DIG. 904, DIG. 905; 220/428; 159/32; 426/465, 471; 432/226

[56] References Cited

U.S. PATENT DOCUMENTS

| | | |
|---|---|---|
| 31,763 | 3/1861 | Huckins et al. |
| 396,208 | 1/1889 | Herndon |
| 2,301,589 | 11/1942 | Shepard ................................ 34/208 |
| 2,452,983 | 11/1948 | Birdeye ...................................... 34/9 |
| 2,877,564 | 3/1959 | Leportier .............................. 34/163 |
| 3,209,465 | 10/1965 | Arena ...................................... 34/50 |
| 3,259,995 | 7/1966 | Powischill ............................. 34/50 |
| 3,294,039 | 12/1966 | Ogden ................................... 165/46 |
| 3,998,977 | 12/1976 | Rabeler ............................... 426/144 |
| 4,112,586 | 9/1978 | Lehtinen ................................. 34/9 |
| 4,155,402 | 5/1979 | Just ..................................... 165/46 |
| 4,278,697 | 7/1981 | Liebermann ........................... 34/50 |
| 4,373,511 | 2/1983 | Miles et al. ........................ 220/428 |
| 4,567,877 | 2/1986 | Sepahpor .......................... 126/246 |

*Primary Examiner*—Albert J. Makay
*Assistant Examiner*—David W. Westphal
*Attorney, Agent, or Firm*—Christensen, O'Connor, Johnson & Kindness

[57] ABSTRACT

A method and apparatus for producing a dried material from a mixture of solid particles colloidally suspended in a liquid, for example, for the production of fruit leather from a pulp and fruit juice mass, include floating an infrared-transparent film on the surface of a body of heated water and placing the material to be dried, such as the pulp and juice mix, on top of the film to absorb heat from the water and thereby cause drying of the material. The apparatus for carrying out the method includes a reservoir of water, a film floated on the water, and a heater for maintaining the temperature of the water at a predetermined level. In a preferred embodiment, the reservoir is in the form of an elongated trough and the film comprises an endless strip of polyester material, such as Mylar, to form a conveyor belt that floats on the surface of the water in the trough and carries the material to be dried on it.

12 Claims, 2 Drawing Figures

METHOD AND APPARATUS FOR DRYING FRUIT PULP AND THE LIKE

BACKGROUND OF THE INVENTION

This invention relates to the drying of fruit pulp and the like and, more particularly, to the efficient transfer of heat to the material being dried.

Most presently used processes for drying fruit pulp to produce, for example, fruit leathers or concentrates of the pulp, involve placing the pulp on a carrier and then heating the carrier to dry the pulp. In these systems the entire carrier is heated, regardless of whether it contains pulp or not and a substantial heat transfer occurs from the carrier to the air in places on the carrier where there is no pulp, without any appreciable use of that heat in the drying of the pulp. For example, in the system of Shepard, shown in U.S. Pat. No. 2,301,589, issued Nov. 10, 1942, a metallic carrier is provided and the pulp is laid on the metallic carrier. The carrier is then heated through electrical induction and the heat used to drive the moisture from the pulp. Since the entire carrier is heated, it is necessary to ensure that every portion of the carrier is covered with pulp in order to obtain the most efficient heat transfer from the carrier to the pulp. In actual practice, it is difficult if not impossible to obtain such complete coverage of the carrier and therefore heat is lost to the open air without doing any substantial work in drying the pulp, causing more heat to be consumed than is necessary simply to dry the pulp. In a system like that of Shepard's, the only way to obtain 100 percent heat transfer from the carrier medium to the pulp is to have an inspection and control station to monitor the coverage of the carrier by the pulp and adjust the pulp so that it covers every open area of the carrier. This causes additional problems in labor and monitoring controls that may be enough to offset any gain in efficiency of heating.

SUMMARY OF THE INVENTION

The present invention provides a method and apparatus for drying fruit pulp and other like materials, in which the transfer of heat from the heated medium to the pulp occurs most efficiently and that substantially eliminates heat loss in areas of a carrier medium carrying the pulp that are open to the air and are not covered by the pulp. More specifically, the present invention provides a method of drying a product, such as pulp, that includes the steps of floating a film of transparent material on a body of water, heating the water to maintain the water at a predetermined temperature, and placing the product to be dried on the floating film. In order to carry out this method, an apparatus is provided that includes a reservoir of water and means associated with the reservoir of water for heating the water to the predetermined temperature and maintaining the reservoir of water at that predetermined temperature. A transparent, solid film is floated on the surface of the heated water and is adapted to receive the pulp or other material to be dried.

In preferred forms of the invention the floating material can be a flexible plastic and can be arranged on a conveyor system so that it moves across the reservoir of water carrying the pulp from a loading station to a removal station with the timing of the conveyor belt and the parameters of the product being applied to the conveyor belt being such that the product is applied in a colloidal suspension of solid particles in a liquid base at one end of the conveyor and removed in its dried state at the second end of the conveyor. While certain preferred materials are known for use as the floating carrier film, it is sufficient if the carrier is transparent to infrared radiation and able to withstand temperatures in the range of the boiling point of water without shrinkage or deterioration of the material.

BRIEF DESCRIPTION OF THE DRAWINGS

The operation and advantages of the present invention will be better understood by those of ordinary skill in the art and others upon reading the ensuing specification when taken in conjunction with the appended drawings wherein.

DETAILED DESCRIPTION OF THE PREFERRED EMBODIMENT

In accordance with the present method, a reservoir of water, such as in a trough, is heated to some predetermined temperature. Preferably, the temperature of the water is maintained as close as possible to the boiling point of water without actually producing boiling. Therefore, at sea level, the temperature would be close to 100 degrees C. A thin film of transparent material, such as a polyester film, is floated on the water surface in the trough so that it covers substantially the entire open surface area of the water. Because of the reflective properties of the water surface and the film covering the water, there is little, if any, evaporative heat transfer from the water to the air above it. When a product to be dried, such as a puree of fruit pulp, is placed on the film, the portion of the film carrying the product is brought into intimate contact with the surface of the water. The contact between the film carrying the product to be dried and the surface of the water enables a transfer of heat directly from the water through the film into the product to be dried, causing the moisture in the product to be driven off. There is substantially no transfer of heat from the water at those surface locations not covered by the product and still covered by the film because of the reflective properties of the water surface and therefore the heat transfer from the water is confined to the product to be dried, such that the maximum efficient use of the heat is accomplished.

It is necessary that the film covering the water be able to withstand the heat and the temperature of the water without deteriorating or shrinking. It is also necessary that the film be transparent to infrared heat radiation, which, in turn, means that it will typically be optically transparent as well, although, it is the transparency to the infrared wavelengths that is important and not the passage of visible light.

Figure 1:
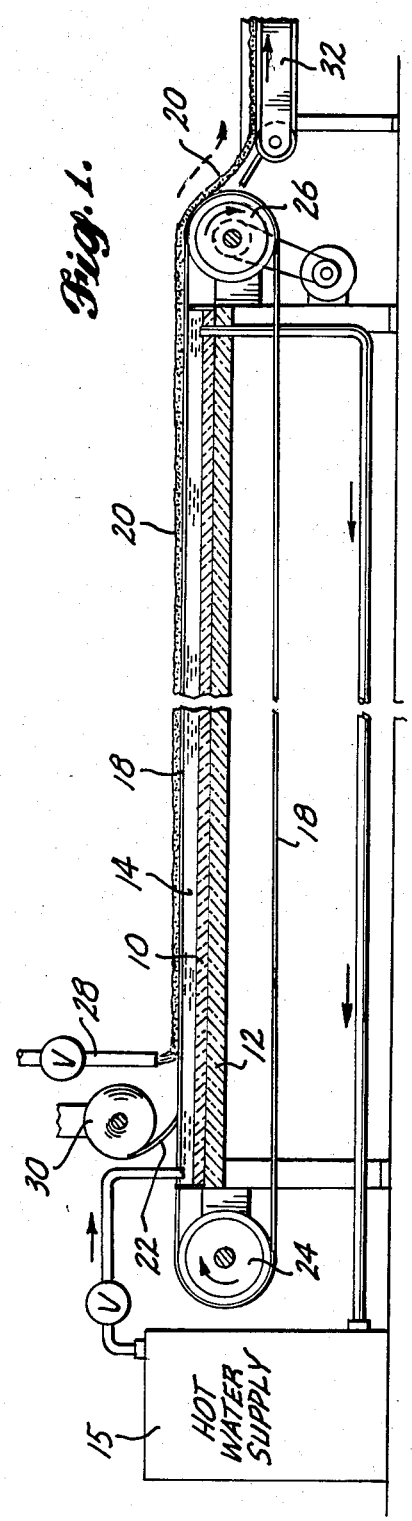
FIG. 1 is a side elevational view of one embodiment of a fruit pulp-drying apparatus made in accordance with the principles of the present invention.
Figure 2:
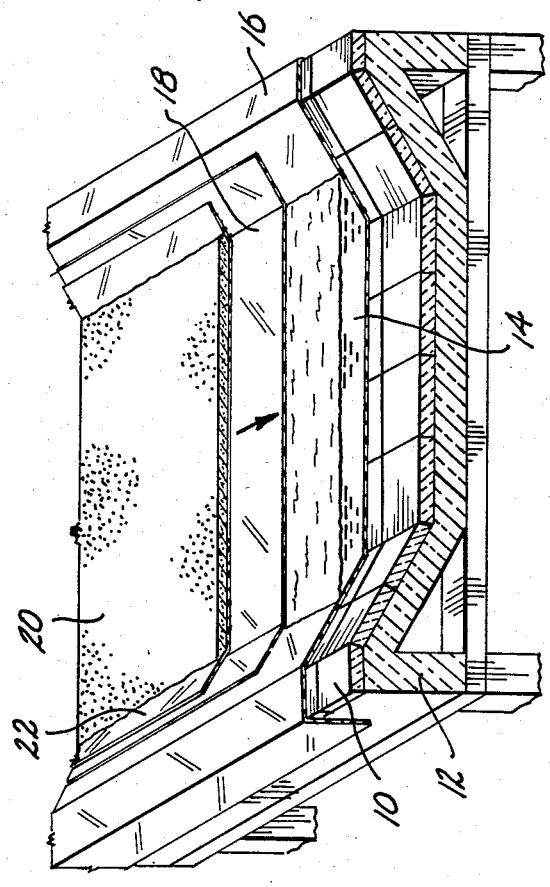
FIG. 2 is an isometric view of a portion of the drying apparatus of FIG. 1 with portions removed for ease of viewing.

An embodiment of an apparatus useful in a continuous drying process to carry out the method described above is shown in FIGS. 1 and 2. A trough 10 is formed of some nonporous medium, such as ceramic tile, and acts as a receptacle for the heated water used in the drying process. The ceramic tile trough is found to be desirable because of its low heat-conducting properties and also its ability to be easily cleaned, for use with edible foostuffs; however, any suitable rigid trough will suffice, for example, one made of stainless steel. In order to minimize the heat loss of water in the trough, the trough is additionally insulated by insulation layer 12, positioned below the trough. The heated water 14 is pumped into the trough from a source 15 of heated water, which can be an electric water heater, or a boiler fueled by any suitable fuel source, such as natural gas, wood, coal, et cetera. In practice, the water flows into the trough at a first end and the trough is preferably tilted slightly along its length so that the water runs by the force of gravity to a second end of the trough from which it is pumped back to the hot water source, reheated to the desired temperature, and then pumped back into the trough so that the water in the trough is always maintained at the predetermined, desired temperature. In the illustrated embodiment, a polyethylene sheet 16 lines the inner surface of the trough 10 and overhangs the edges of the trough to provide an additional moisture and heat barrier between the water and the trough. In practice, it has been found that a moisture layer of condensation builds up on the underside of the polyethylene sheet 16 between the sheet and the interior of the trough, which acts as a further heat barrier, thereby minimizing heat loss from the water to the walls of the trough 10. A flexible sheet of infrared transparent material 18 floats on the surface of the water 14 in the trough. A suitable material has been found to be a 3-mil-thick sheet of polyester film available from E. I. Dupont De Nemours Co. under the name 300A Mylar. The 300A Mylar meets all of the requirements of the invention in that it shows very little distortion or shrinkage in the operable temperature range. It is flexible so that it lends itself to a conveyor belt type of application and also has the strength required to operate for long periods of time without breakage. While the polyester sheet 18 only needs to float on top of the water in the illustrated embodiment, the polyester sheet is wider than the trough 10 so that it not only overlies the water but also rides slightly up the sides of the trough. The extra width of the polyester sheet 18 ensures a complete coverage of the water so that there is no evaporative exposure of the water to the open air above the trough. The overwide sheet 18 also provides a channel that keeps the product to be dried, typically a fruit pulp puree consisting of solid particles in suspension in a fruit juice, from running off of the polyester sheet into the hot water. The material to be dried, for example, fruit pulp 20, is placed on top of the polyester sheet 18 and remains on the polyester sheet until it reaches the proper consistency or dryness, that is, until a predetermined amount of the moisture is driven off the mixture by the heat transferred from the hot water to the fruit pulp through the polyester sheet.

Depending on the final product sought, the thickness of the fruit pulp will vary; however, it has been found that a thickness of approximately one-eighth to three-sixteenths of an inch is capable of producing a satisfactory fruit leather. In the illustrated embodiment, a thin sheet 22 of material such as polyethylene, for example, 0.5 to 1.5 mils thick, is placed between the polyester sheet 18 and the fruit pulp 20. The polyethylene sheet 22 does not enter directly into the workings of the process of the present invention, but, rather, supplies a convenient medium upon which to place the fruit pulp to prevent adherence of the pulp to the polyester sheet 18. The polyethylene sheet 22 is removed from the polyester sheet 18 with the fruit pulp to maintain the polyester sheet 18 in a clean condition suitable for use with edible footstuffs. Also, the polyethylene sheet separates easily from the Mylar sheet 18 so that the Mylar sheet is not damaged as it might be if it was necessary to scrape the dried fruit leather directly off of the polyester sheet. The polyethylene sheet 22 and dried fruit leather can be rolled simultaneously from the polyester sheet to provide a convenient method by which the fruit leather is transported and/or stored after its removal from the dryer.

In one preferred form of the invention, the polyester sheet 18 is formed in an endless belt and is carried by a pair of rollers 24 and 26, respectively, mounted at either end of the trough to form a conveyor belt. The fruit pulp 20 is introduced onto the polyester sheet at a first end of the trough from a discharge means 28. The polyethylene sheet 22 is fed from a roll 30, also at the first end of the trough 10, so that the pulp 20 lies on the polyethylene sheet 22. The pulp moves over the hot water 14 on the polyester sheet conveyor belt 18 to the second end of the trough 10. The speed of the conveyor belt is regulated so that the time that it takes for the fruit pulp to travel from one end of the trough to the other is sufficient to produce the proper drying of the fruit pulp so that it can be removed along with the polyethylene sheet 22 at the second end of the trough. The polyester belt 18 continues on under the trough 10 in a typical conveyor fashion, while the dried pulp is moved away on a second conveyor 32. In one form of the invention, which has been tested, it has been found that a fruit pulp of one-eighth to three-sixteenths inch thickness placed on a Mylar sheet 3 mils thick over a trough of water in which the water depth is approximately one inch and the water is heated to just below the boiling point, that is, just below 100 degrees C., takes approximately two and one-half hours to dry to a suitable fruit leather dryness. It is necessary to keep a slack in the polyester conveyor belt 18 so that the film floats on the water and is not under such tension that it resists contact with the water surface when the pulp is placed on the belt. Typically, the fruit pulp will be open to the air during its drying. It is not desirable to direct any heated or dried air onto the fruit pulp as it dries because this forms an undesirable skin on the top of the pulp and actually impedes drying of the pulp by evaporation. An airflow into and out of the room in which the dryer is located is desirable to maintain the room air at a humidity that allows evaporation of the moisture in the pulp to the air and, in fact, dried heated air can be pumped into the room to lower the ambient humidity and increase the rate of absorption of water vapor by the air. In an apparatus described above with a water depth of one inch in the trough 10, and a trough of approximately 12 meters in length, it has been found that the temperature drop of the water from the inlet at one end of the trough to the outlet from the trough is only approximately 3 degrees C. Therefore, the hot water source does not have to expend much energy in raising the temperature of the water back to the desired temperature prior to reintroduction of the water into the trough.

It will be understood that while one application of the invention described herein is in the production of fruit leather from a puree of fruit pulp and juice, the invention is not limited to the use with such fruit pulps. It also can be used for drying vegetables, or even soups and stews that have been blended to an even consistency prior to drying. Also, the invention, rather than completely drying a mixture, can be used to produce juice concentrates very rapidly; for example, in the 12-meter trough above, it has been found that introduction of tomato juice on one end will produce a 50-percent concentrate in approximately one and one-half hours' time from the exit end of the trough. It is important that the temperature of the fruit or other mixture be kept below the boiling point so that there is no disruption of the material on the polyester sheet and, typically, the fruit pulp is kept at a temperature of between 80 and 90 degrees C. Also, the water temperature, of course, should be kept below boiling in order to prevent bubbling and evaporation of the water from the trough.

While a preferred embodiment of the invention has been described and illustrated, it is clear that many changes can be made to the illustrated and described embodiment without exceeding the scope of the invention. For example, while particular materials such as the DuPont 300A Mylar have been described as being a suitable and even a desirable medium upon which to place the material to be dried, other media are also workable with the invention and, in fact, even a sheet of glass could be used, except for its undesirable properties of inflexibility. Also, while a conveyor system has been described, it is possible simply to utilize the invention by floating an infrared-transparent film on a body of hot water and then simply placing the material to be dried on the film, allowing it to sit in a stationary location on the reservoir of heated water without the use of a conveyor. The use of a conveyor does not affect the basic concept of the invention, but, rather, adds to the production capacity of a dryer made in accordance with the principles of the present invention. Since many changes can be made to the illustrated and described embodiment without exceeding the scope of the invention, the invention should be defined solely with reference to the claims that follow.

The embodiments of the invention in which an exclusive property or privilege is claimed are defined as follows:

1. A method of drying a product comprising the steps of:
    (a) positioning a sheet of optically and infrared transparent material on a body of water so that a first surface of the sheet is in substantially uniform contact with an upper surface of the water and the sheet is supported by the buoyant force of the water;
    (b) heating the water to maintain the water at a predetermined temperature; and
    (c) placing the product to be dried on a second surface of the sheet.

2. The method of claim 1, further including the step of controlling the ambient air to maintain a level of humidity that maximizes the absorption rate of water vapor by the air.

3. The method of claim 1, further including the step of placing an optically and infrared transparent release medium on the sheet prior to placing the product on the sheet to ease the removal of the product from the sheet after drying.

4. An apparatus for drying a material comprising:
    a reservoir of water;
    a heating means associated with the reservoir of water for heating the water to a predetermined temperature and maintaining the water in the reservoir at said predetermined temperature; and
    an optically and infrared transparent, solid sheet positioned on the surface of the heated water for receiving the material to be dried, said sheet being supported by the buoyant force of the water.

5. The apparatus of claim 4, wherein said sheet comprises a sheet of polyester material.

6. The apparatus of claim 4, wherein said sheet substantially covers the entire surface of said reservoir so as to retard evaporation from the surface of the water.

7. The apparatus of claim 4, wherein said heating means includes a water heater separate from said reservoir, said water being heated in said water heater, said reservoir including an inlet to receive heated water from said water heater and an outlet to discharge water back to said water heater for reheating.

8. The apparatus of claim 4, wherein said sheet, as it is supported on the surface of said water, is moved in relation to the surface of said water in said reservoir.

9. The apparatus of claim 8, wherein said sheet is in the form of an endless belt that forms a conveyor to carry the product over the reservoir of water.

10. The apparatus of claim 4, further including a separation means between said sheet and said material to be dried, said separation means comprising a second optically and infrared transparent sheet.

11. The apparatus of claim 4, wherein said sheet comprises a web of pliant, impervious plastic material.

12. Method of providing heat transfer between a body of transparent liquid and a product, comprising the steps of:
    (a) positioning a sheet of optically and infrared transparent impervious material on the surface of the liquid so that the sheet is supported by a buoyant force of the liquid;
    (b) maintaining the temperature of the liquid at a predetermined temperature;
    (c) placing the product on the sheet.

* * * * *